US012362112B2

(12) United States Patent
Rhein et al.

(10) Patent No.: US 12,362,112 B2
(45) **Date of Patent: *Jul. 15, 2025**

(54) SYSTEM AND METHOD FOR PROVIDING INDICATION OF A CLOSED SWITCH

(71) Applicant: Hubbell Incorporated, Shelton, CT (US)

(72) Inventors: David Rhein, Saint Jacob, IL (US); Angelo Rizzo, Mississauga (CA)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,897

(22) Filed: Dec. 29, 2023

(65) Prior Publication Data

US 2024/0136129 A1 Apr. 25, 2024

Related U.S. Application Data

(63) Continuation of application No. 17/533,867, filed on Nov. 23, 2021, now Pat. No. 11,908,644, which is a continuation of application No. 16/105,468, filed on Aug. 20, 2018, now Pat. No. 11,367,584.

(60) Provisional application No. 62/551,879, filed on Aug. 30, 2017, provisional application No. 62/548,027, filed on Aug. 21, 2017.

(51) Int. Cl.
*H01H 31/02* (2006.01)
*H01H 9/16* (2006.01)

(52) U.S. Cl.
CPC .............. *H01H 31/02* (2013.01); *H01H 9/16* (2013.01); *H01H 31/023* (2013.01); *H01H 31/026* (2013.01); *H01H 2239/06* (2013.01)

(58) Field of Classification Search
CPC .... H01H 31/02; H01H 31/023; H01H 31/026; H01H 9/16; H01H 2239/06
See application file for complete search history.

(56) References Cited

U.S. PATENT DOCUMENTS

| | | | |
|---|---|---|---|
| 3,705,279 | A | 12/1972 | Kerr, Jr. |
| 4,112,268 | A | 9/1978 | Chung |
| 4,357,503 | A | 11/1982 | Kowalik |
| 5,874,900 | A | 2/1999 | Panto |
| 7,501,775 | B2 | 3/2009 | Valdemarsson et al. |
| 8,810,414 | B2 | 8/2014 | Vitucci |
| 8,829,372 | B1 | 9/2014 | Rhein |
| 9,041,402 | B2 | 5/2015 | Lalonge et al. |

(Continued)

FOREIGN PATENT DOCUMENTS

WO 2019/180729 A1 9/2019

OTHER PUBLICATIONS

International Search Report and Written Opinion issued on Nov. 14, 2018, by the International Searching Authority in corresponding International Patent Application No. PCT/2018/47079. (11 pages).

*Primary Examiner* — Quan Zhen Wang
*Assistant Examiner* — Mancil Littlejohn, Jr.
(74) *Attorney, Agent, or Firm* — Robinson + Cole LLP

(57) ABSTRACT

A system for collecting information related to an electrical switch. The system including a first switch, a second switch, and an external device. The external device is configured to receive the first and second signals corresponding to the first and second switches. Wherein the external device is located remotely from the first switch and the second switch.

20 Claims, 6 Drawing Sheets

(56) References Cited

U.S. PATENT DOCUMENTS

| | | | | |
|---|---|---|---|---|
| 9,052,363 | B2 * | 6/2015 | Rostron ................. | H01H 9/167 |
| 2012/0022707 | A1 | 1/2012 | Budhraja et al. | |
| 2014/0071592 | A1 * | 3/2014 | Phillips .................... | H02B 5/00<br>361/602 |
| 2019/0057824 | A1 | 2/2019 | Rhein et al. | |
| 2019/0267199 | A1 | 8/2019 | Lewis et al. | |

* cited by examiner

SYSTEM AND METHOD FOR PROVIDING INDICATION OF A CLOSED SWITCH

RELATED APPLICATIONS

This application is a continuation of U.S. patent application Ser. No. 17/533,867, filed Nov. 23, 2021, which is a continuation of U.S. patent application Ser. No. 16/105,468, filed Aug. 20, 2018, which claims benefit to U.S. Provisional Patent Application No. 62/548,027, filed on Aug. 21, 2017, and U.S. Provisional Patent Application No. 62/551,879, filed on Aug. 30, 2017, the entire contents of which are incorporated herein by reference.

FIELD

Embodiments relate to electrical switches, and more particularly, high-voltage electrical switches.

SUMMARY

When electrical switches, such as air break switches, are not placed in a fully closed position, electrical contacts of the electrical switch may have a high resistance that may lead to over-heating and even failure of the switch.

Thus, one embodiment provides a system for collecting information related to an electrical switch. The system including a first switch, a second switch, and an external device. The first switch includes a first blade pivotable between an open position and a closed position, a first electrical terminal configured to receive the first blade when in the closed blade position, and a first sensor coupled to the first electrical terminal. The first sensor is configured to sense a position of the first blade, and output a first signal corresponding to the position of the first blade. The second switch includes a second blade pivotable between an open position and a closed position, a second electrical terminal configured to receive the second blade when in the closed blade position, and a second sensor coupled to the second electrical terminal. The second sensor is configured to sense a position of the second blade, and output a second signal corresponding to the position of the second blade. The external device is configured to receive the first and second signals. Wherein the external device is located remotely from the first switch and the second switch.

Another embodiment provides a method of indicating position of a first blade and a second blade of a switch. The method including sensing, via a first sensor, a position of the first blade; outputting a first signal indicative of the position of the first blade; and receiving, via an external device located remotely from the sensor, the first signal indicative of the position of the blade. The method further includes sensing, via a second sensor, a position of a second blade; outputting a second signal indicative of the position of the second blade; and receiving, via the external device, the second signal indicative of the position of the second blade.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
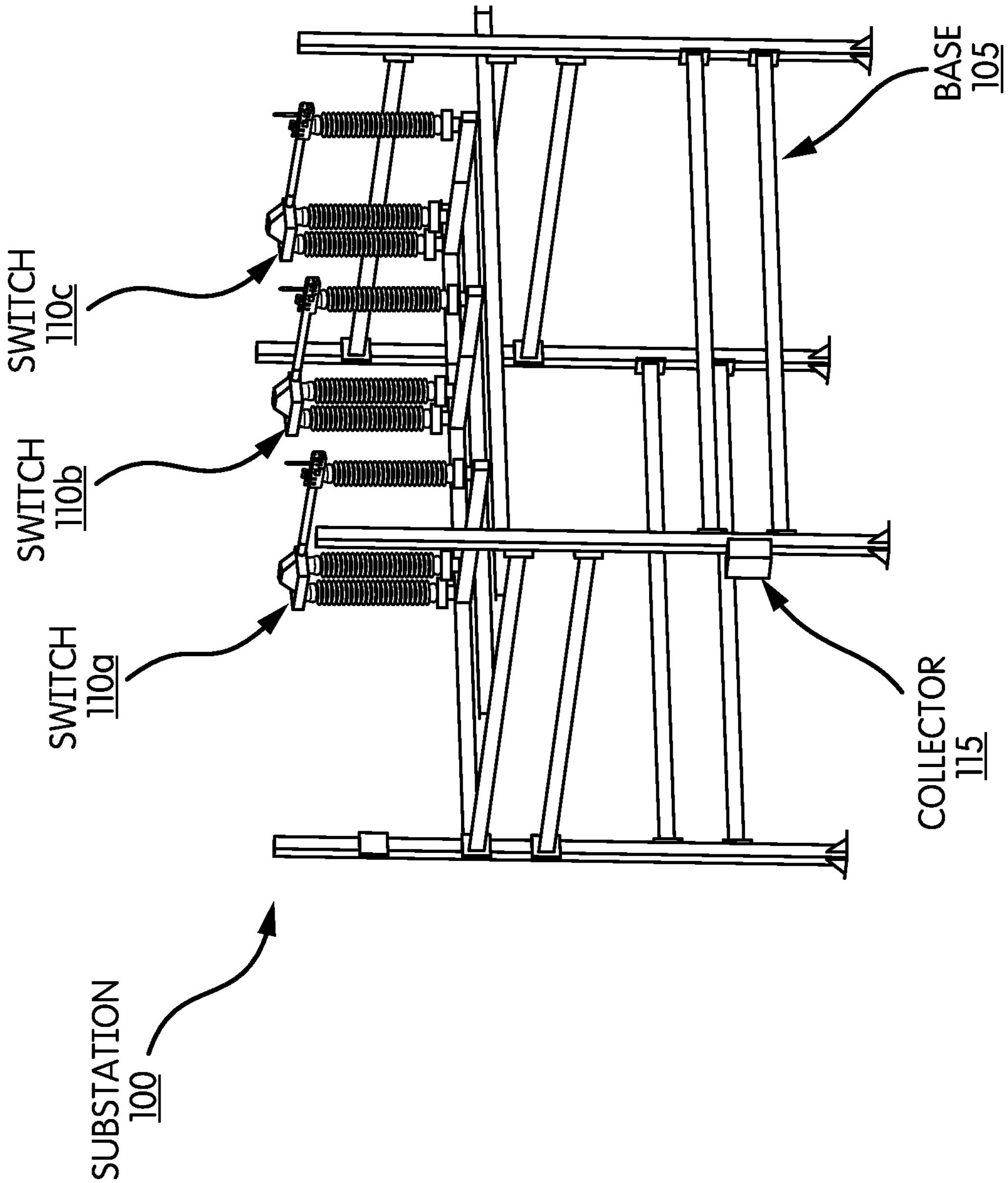
FIG. 1 is a perspective view of a substation according to some embodiments.

FIG. 1 is a perspective view of a substation 100 according to some embodiments. The substation 100 includes a base 105, one or more switches 110*a*-110*c*, and a collector 115. The base 105 is configured to support the switches 110. In some embodiments, the collector 115 is further supported by the base 105. In other embodiments, the collector 115 is located remotely from the base 105. The base 105 may be any type of appropriate utility structure, including but not limited, to a substation structure.

Figure 2:
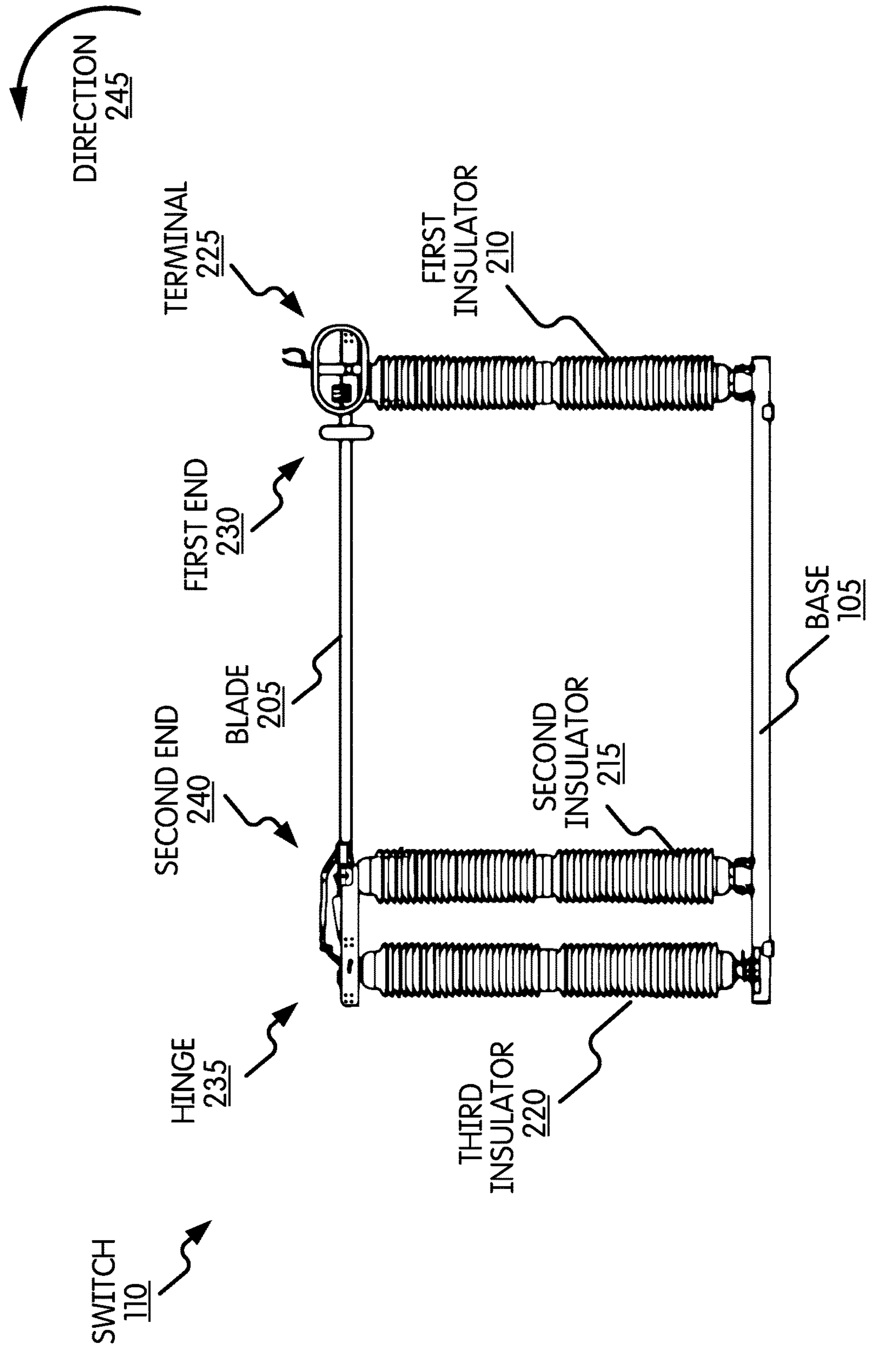
FIG. 2 is a side view of a switch of the substation of FIG. 1 according to some embodiments.

FIG. 2 illustrates a perspective view of a switch 110 according to some embodiments. Switch 110 may be a high voltage and/or high current switch configured to electrically connect/disconnect a power source to a load. In some embodiments, switch 110 is an air break switch. Although illustrated as a vertical break switch, in other embodiments, switch 110 may be a side break switch, a double end break switch, a center break switch, a hookstick switch, or any other switch style.

Switch 110 includes a blade 205 configured to move between a closed position (as illustrated in FIG. 2) and an open position. The switch 110 further includes a first insulator 210, a second insulator 215, and a third insulator 220, supported by the base 105.

The first insulator 210 supports an electrical terminal 225. The electrical terminal 225 is configured to receive a first end 230 of the blade 205. The second insulator 215 supports a hinge 235. The hinge 235 rotatably mounts the blade 205 at a second end 240 of the blade 205, opposite the first end 230.

In operation, when the blade 205 is in the closed position (as illustrated in FIG. 2), the power source is electrically connected to the load. When in the closed position, the blade 205 may be rotated, in a first direction 245, to the open position. When the blade 205 is in the open position, the power source is electrically disconnected from the load.

Figure 3A:
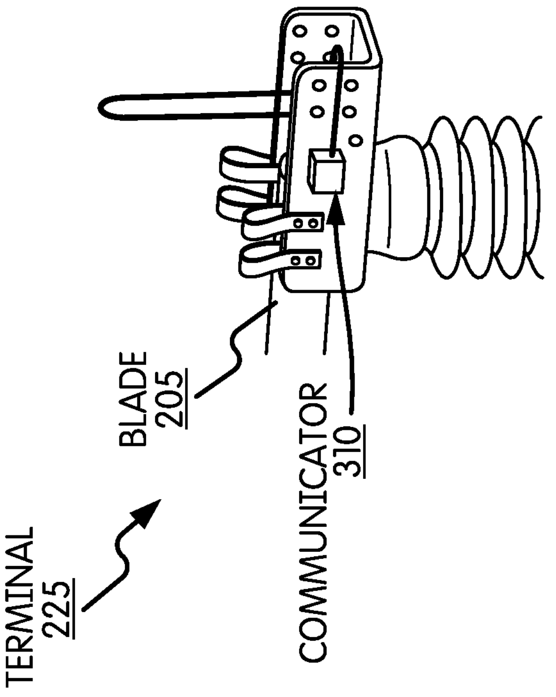
FIGS. 3A & 3B are perspective views of a terminal of a switch of the substation of FIG. 1 according to some embodiments.
Figure 3B:
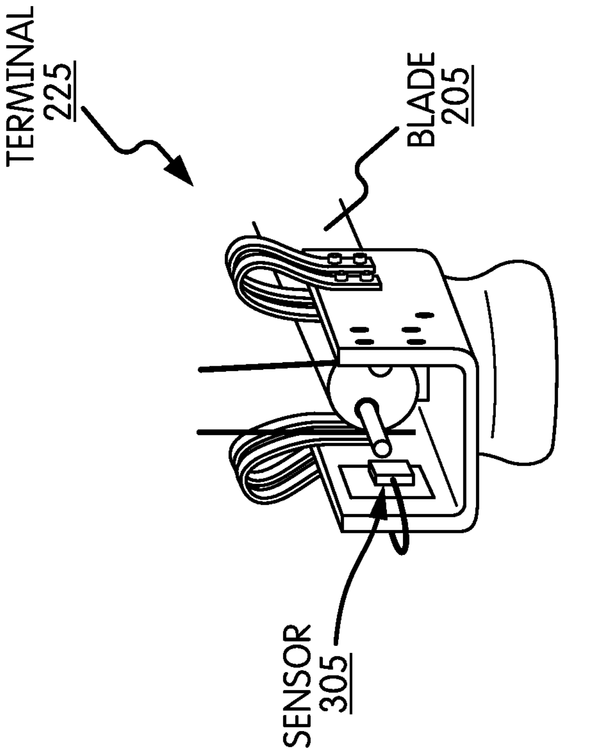

FIGS. 3A & 3B illustrate enlarged views of the terminal 225 according to some embodiments. Terminal 225 may include a sensor 305 electrically and/or communicatively coupled to a communicator, or communication device, 310. In some embodiments, the sensor 305 is configured to determine when the blade 205 is fully in the closed position. In such an embodiment, the sensor 305 may be a limit switch. In other embodiments, the sensor 305 may be another type of proximity sensor, including but not limited to, a Hall effect sensor, a capacitive sensor, an optical sensor, an inductive sensor, or an ultrasonic sensor.

In some embodiments, sensor 305 is a temperature sensor. In such an embodiment, the sensor 305 is configured to sense a temperature of the terminal 225. In such an embodiment, the temperature sensor may be a thermocouple or similar temperature sensor.

In yet other embodiments, the substation 100 includes one or more temperature sensors configured to sense one or more temperatures of the substation 100 at various locations. In such an embodiment, the one or more sensors may output temperature data to the communicator 310.

The communicator 310 is configured to receive a signal from the sensor 305 indicative of the position (for example, closed position or open position) of the blade 205. The communicator 310 is further configured to output a signal indicative of the position of the blade 205 to an external device. In some embodiments, the communicator 310 is coupled to the sensor 305 via a wired connection. In other embodiments, the communicator 310 is coupled to the sensor 305 via a wireless connection. In yet other embodiments, the communicator 310 and the sensor 305 form a single unit.

Figure 4:
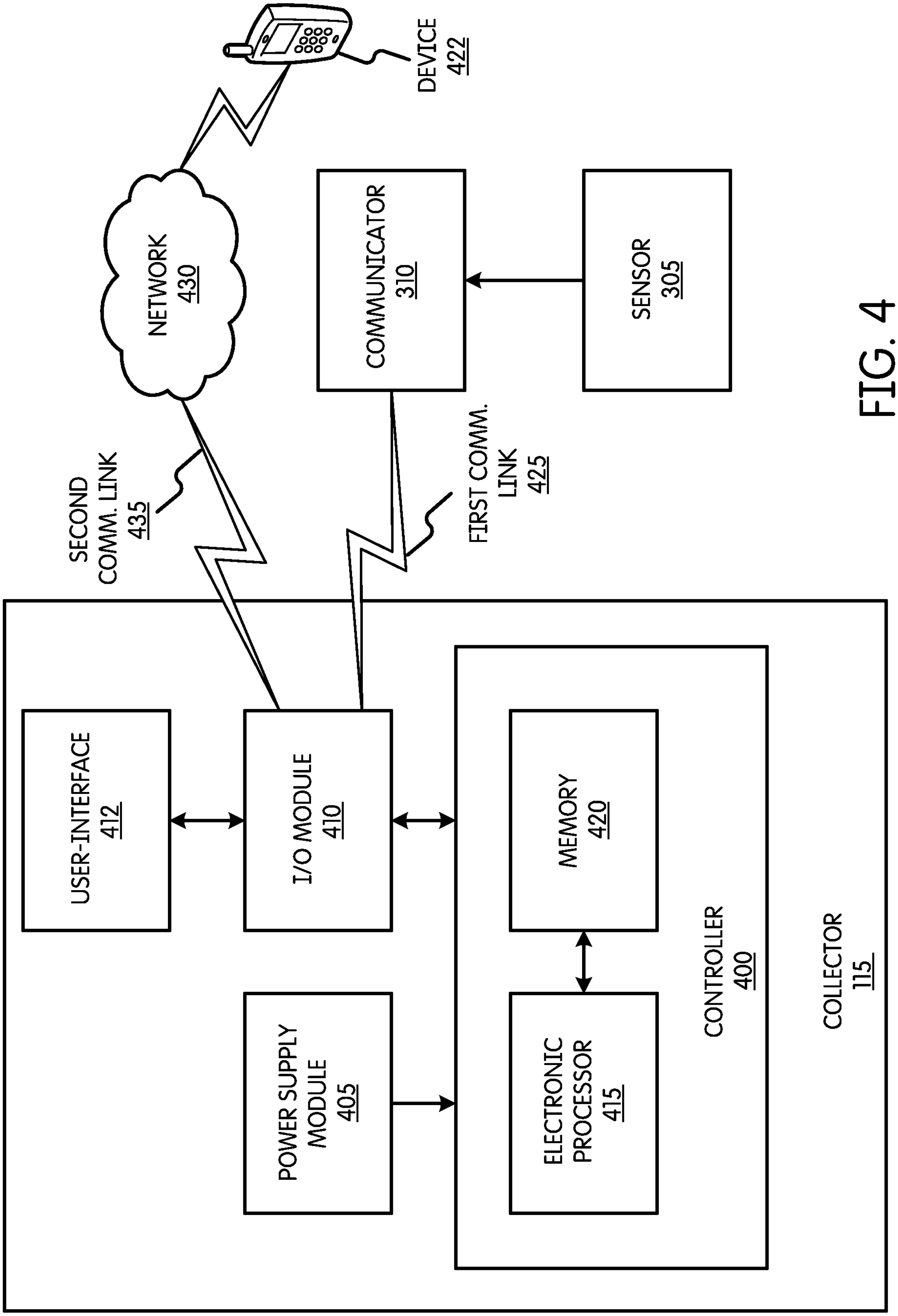
FIG. 4 is a block diagram of a collector of the substation of FIG. 1 according to some embodiments.

FIG. 4 is a block diagram of the collector 115 according to some embodiments. The collector 115 includes a controller 400 electrically and/or communicatively connected to a variety of modules or components of the collector 115. For example, the controller 400 may be connected to a power supply module 405, an input/output (I/O) module 410, and a user-interface 412.

In some embodiments, the controller 400 includes a plurality of electrical and electronic components that provide power, operational control, and protection to the components and modules within the controller 400 and/or the collector 115. For example, the controller 400 includes, among other things, an electronic processor 415 (for example, a microprocessor or another suitable programmable device) and the memory 420.

The memory 420 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 415 is communicatively coupled to the memory 420 and executes software instructions that are stored in the memory 420, or stored on another non-transitory computer readable medium such as another memory or a disc. The software may include one or more applications, program data, filters, rules, one or more program modules, and other executable instructions.

The power supply module 405 is configured to supply a nominal power to the controller 400 and/or other components/modules of the collector 115. In some embodiments, the power supply module 405 receives power from an external source. In other embodiments, the power supply module 405 may receive power from another power sources, such but not limited to, a battery and/or a renewable power source.

The I/O module 410 is configured to provide communication between collector 115 and one or more networks and/or devices (for example, communicator 310 and/or device 422). In the illustrated embodiment, the I/O module 410 provides communication with the communicator 310, via a first communication link 425, and provides communication with a network 430, via a second communication link 435. In some embodiments, the first communication link 425 is a wireless communication link (for example, a radio frequency (RF) communications link, a Bluetooth communications link, a WiFi communications link, etc.). In some embodiments, the first communication link 425 may be part of a local area network (LAN), a neighborhood area network (NAN), a home area network (HAN), or personal area network (PAN).

In some embodiments, the second communication link 435 may also be a wireless communication link (for example, a radio frequency (RF) communications link, a Bluetooth communications link, a WiFi communications link, etc.). In some embodiments, the collector 115 may communicate with the device 422 through the second communication link 435 and the network 430. The network 430 is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). The device 422 may be any external electronic device, for example, an external computer (for example, main computer 605 of FIG. 6), a server, a tablet, a smart phone, etc.

The user-interface 412 is configured to output information concerning the collector 115, switch 110 (for example, blade position), and/or the substation 100. The user-interface 412 may include a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

In operation, sensor 305 senses the position (for example, open position and/or closed position) of blade 205. The sensor 305 sends a first signal indicative of blade position to the communicator 310. The communicator 310, via the first communication link 425, sends a second signal indicative of blade position to collector 115. The collector 115 may then output the blade position using the user-interface 412 and/or output the blade position via the second communication link 435 and network 430.

Figure 5:
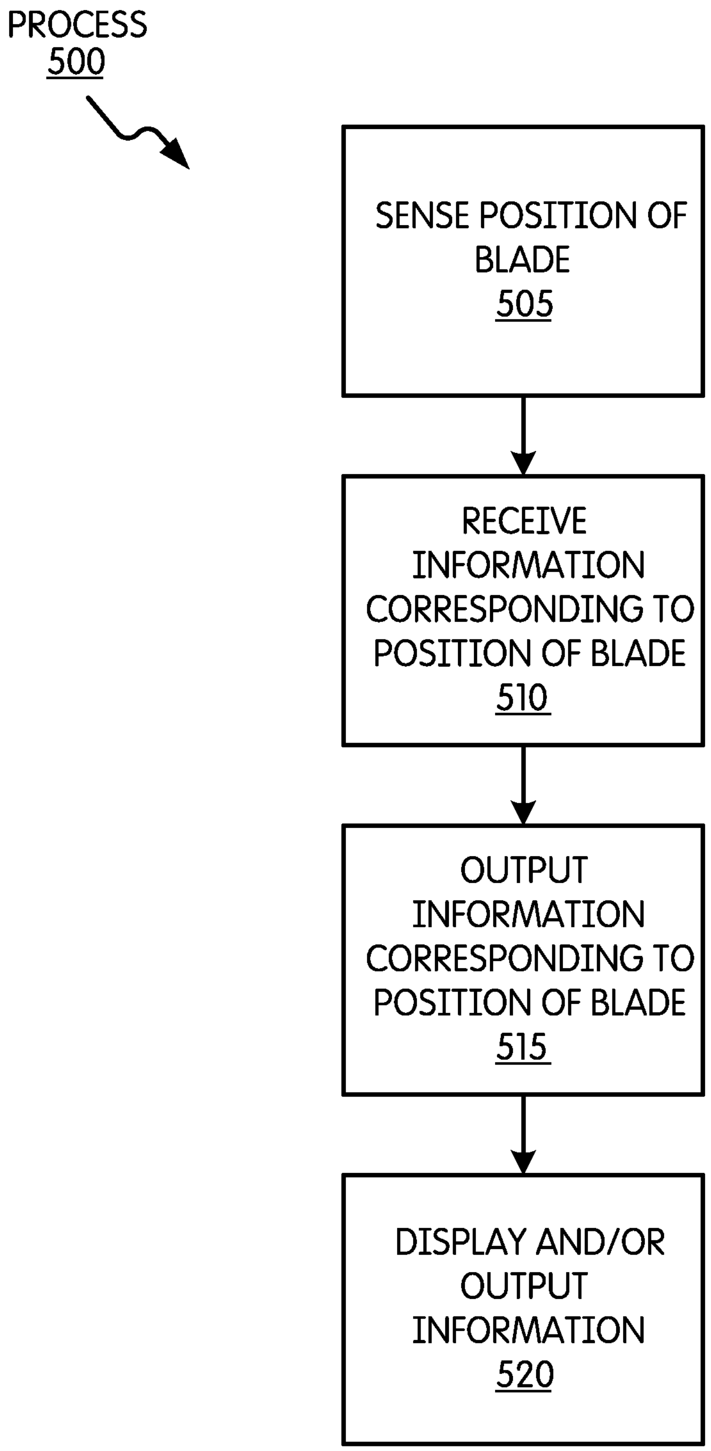
FIG. 5 is a flowchart illustration an operation of the substation of FIG. 1 according to some embodiments.

FIG. 5 illustrates a process, or operation, 500 according to some embodiments. It should be understood that the order of the steps disclosed in process 500 could vary. Furthermore, additional steps may be added to the process and not all of the steps may be required. Sensor 305 senses a position of blade 205 (block 505). Communicator 310 receives information corresponding to the position of blade 205 (block 510). Communicator 310 outputs a signal indicative of the position of blade 205 to the collector 115 (block 515). The collector 115 outputs information indicative of the position of the blade 205 (block 520). As discussed above, the collector 115 may output the information to user-interface 412 and/or a device 422. In some embodiments, process 500 may be repeated at predetermined time periods (for example, every 1 ms, every 1 minute, etc.).

Figure 6:
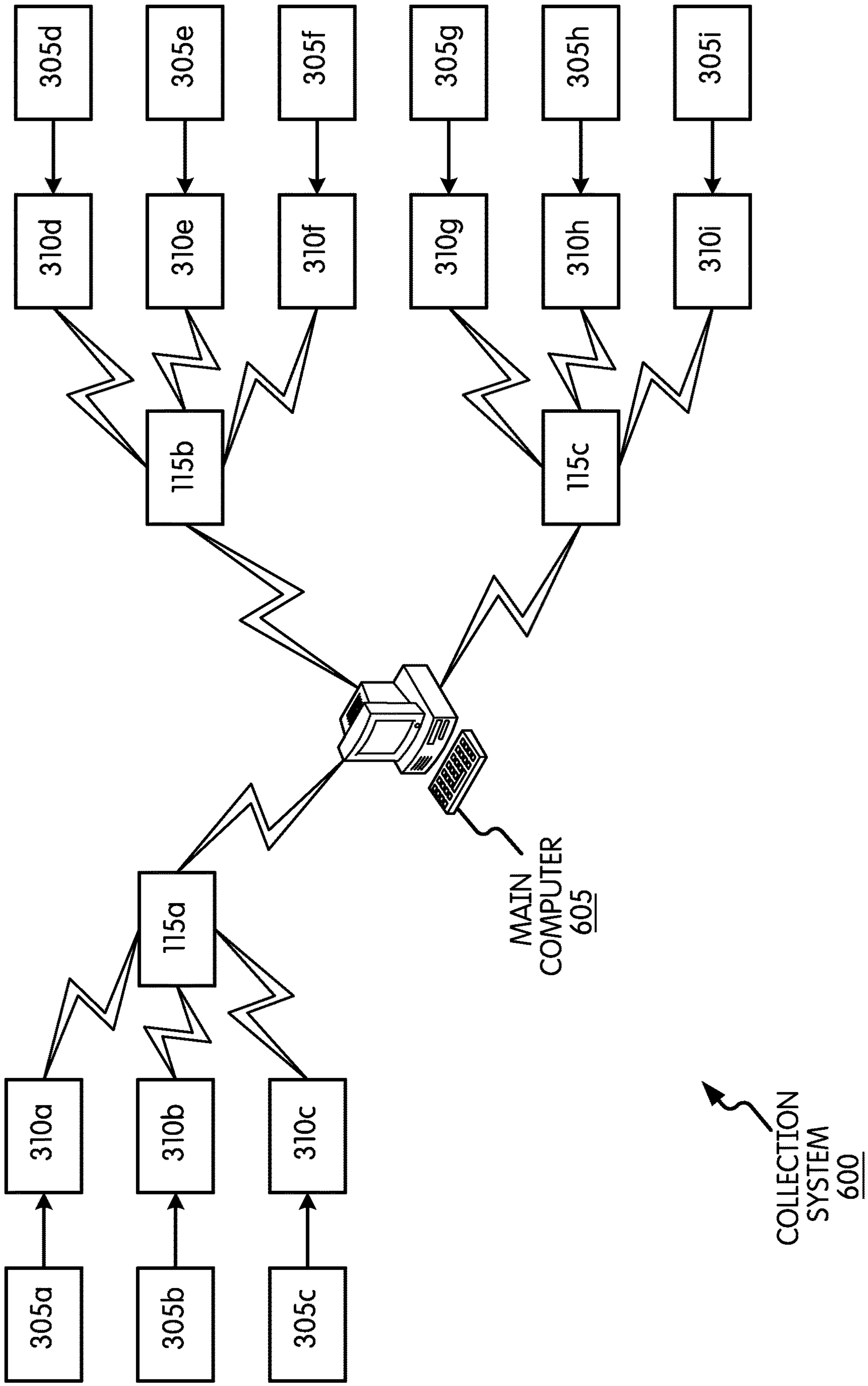
FIG. 6 is a block diagram of a collection system according to some embodiments.

FIG. 6 illustrates a collection system 600 according to some embodiments. The collection system 600 includes a main computer 605, one or more sensors 305*a*-305*i*, one or more communicators 310*a*-310*i*, and one or more collectors 115*a*-115*c*. In some embodiments, the collection system 600 is a supervisory control and data acquisition (SCADA) system.

In operation, each collector 115 may correspond to a base 105. Each collector 115 may be configured to receive one or more signals indicative of blade position from one or more switches 110 (of a respective base 105) including sensors 305 and communicators 310. Each collector 115 is further configured to communicate the blade position of the one or more switches 110 to the main computer 605. The main computer 605 is configured to analyze and/or monitor the blade position of each switch 110 of each base 105. In some embodiments, the main computer 605 is further configured to output information and/or alerts related to the switches 110.

Thus, the application provides, among other things, a system and method for indicating a blade position of one or more switches. Various features and advantages of the application are set forth in the following claims.

What is claimed is:

1. A system for collecting information related to an electrical switch, the system comprising:
a first switch including,
a first blade pivotable between a first open position and a first closed position,
a first electrical terminal configured to receive the first blade when the first blade reaches the first closed position, and
a first sensor on the first electrical terminal, the first sensor configured to sense a position of the first blade, and wherein the first sensor is configured to determine when the first blade is fully in the first closed position;
a second switch including
a second blade pivotable between a second open position and a second closed position,
a second electrical terminal configured to receive the second blade when the second blade reaches the second closed position, and
a second sensor on the second electrical terminal, the second sensor configured to sense a position of the second blade; and
a collector configured to receive a first signal indicative of the position of the first blade and a second signal indicative of the position of the second blade, and output information indicative of the position of the first blade and the position of the second blade;
wherein the information indicative of the position of the first blade and the position of the second blade is sent to an external device located remotely from the first switch and the second switch.

2. The system of claim 1, wherein the collector is remote from the first sensor and from the second sensor, and wherein the first sensor and the second sensor are connected to the collector via a first wireless communication link.

3. The system of claim 2, wherein the collector is remote from the external device, and wherein the collector is connected to the external device with a second wireless communication link that is different than the first wireless communication link.

4. The system of claim 1, wherein the collector includes a user-interface configured to output the information.

5. The system of claim 1, wherein the external device analyzes the information indicative of the position of the first blade and of the second blade, and wherein the external device outputs an alert based on the analysis.

6. A system for collecting information related to an electrical switch, the system comprising:
a first switch including,
a first blade pivotable between an open position and a closed position,
a first electrical terminal configured to receive the first blade when the first blade reaches the closed position, and
a first sensor on the first electrical terminal, the first sensor configured to
sense a position of the first blade, and
output a first signal corresponding to the position of the first blade;
a first communicator located proximate the first sensor, the first communicator configured to,
receive the first signal, and
output a second signal corresponding to the position of the first blade; and
a collector configured to receive the second signal from the first communicator, and output information indicative of the position of the first blade;
wherein the information indicative of the position of the first blade is sent to an external device located remotely from the first switch.

7. The system of claim 6, wherein the external device analyzes the information indicative of the position of the first blade, and wherein the external device outputs an alert based on the analysis.

8. The system of claim 6, wherein the first sensor is at least one selected from a group consisting of a temperature sensor, a limit switch, a capacitive sensor, an optical sensor, an inductive sensor, and an ultrasonic sensor.

9. The system of claim 6, wherein the collector is configured to output the information indicative of position via a display, and wherein the display is controlled by an input device.

10. The system of claim 6, wherein the collector is remote from the first communicator, and wherein the first communicator is connected to the collector via a first wireless communication link.

11. The system of claim 10, wherein the collector is remote from the external device, and wherein the collector is connected to the external device with a second wireless communication link that is different than the first wireless communication link.

12. A method of indicating position of a first blade of a switch, the method comprising:
sensing, via a first sensor, a position of the first blade, wherein the first blade is pivotable between an open position and a closed position;
receiving, via a collector located remotely from the first sensor, a first signal indicative of the position of the first blade, the first signal received through a first communication link;
outputting information indicative of the position of the first blade, the information output via a second communication link that is different than the first communication link; and
sending the information to an external device located remotely from the first sensor.

13. The method of claim 12, further comprising determining, via the first sensor, when the first blade is fully in the closed position.

14. The method of claim 12, wherein the first sensor is a temperature sensor.

15. The method of claim 12, analyzing, via the external device, the information indicative of the position of the first blade, and outputting an alert based on the analysis.

16. The method of claim 12, further comprising outputting the information on a display of the collector.

17. The method of claim 12, wherein the first communication link and the second communication link are wireless communication links.

18. The method of claim 12, wherein a local area network, a neighborhood area network, or a personal area network includes the first communication link.

19. The method of claim 12, wherein a wide area network includes the second communication link.

20. The system of claim 1, wherein the first sensor is at least one selected from a group consisting of a temperature sensor, a limit switch, a capacitive sensor, an optical sensor, an inductive sensor, and an ultrasonic sensor.

* * * * *